United States Patent
Sato et al.

(10) Patent No.: US 6,811,854 B1
(45) Date of Patent: Nov. 2, 2004

(54) SURFACE-TREATMENT AGENT COMPRISING INORGANIC/ORGANIC HYBRID MATERIAL

(75) Inventors: Kazuyuki Sato, Settsu (JP); Masamichi Morita, Settsu (JP); Fumihiko Yamaguchi, Settsu (JP); Yasushi Nakamae, Settsu (JP); Hiroko Yano, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 85 days.

(21) Appl. No.: 10/088,290
(22) PCT Filed: Sep. 13, 2000
(86) PCT No.: PCT/JP00/06257
§ 371 (c)(1),
(2), (4) Date: Mar. 15, 2002
(87) PCT Pub. No.: WO01/21879
PCT Pub. Date: Mar. 29, 2001

(30) Foreign Application Priority Data

Sep. 17, 1999 (JP) .......................................... 11/263591

(51) Int. Cl.[7] .......................... B32B 27/18; B32B 27/30; C08K 5/057; C08K 27/12
(52) U.S. Cl. ....................... 428/141; 428/334; 428/421; 428/522; 524/265; 524/544; 524/545; 525/104
(58) Field of Search ................................ 428/141, 142, 428/334, 365, 375, 421, 422, 500, 522; 442/80, 82, 94; 524/265, 544, 545; 525/104

(56) References Cited

U.S. PATENT DOCUMENTS

| | | | |
|---|---|---|---|
| 3,594,353 A | 7/1971 | Domba | ......................... 526/242 |
| 3,671,574 A | 6/1972 | Knell et al. | ................. 560/197 |
| 3,819,722 A | 6/1974 | Bertin et al. | ................. 569/705 |
| 4,230,728 A | * 10/1980 | Tezuka | ......................... 426/115 |
| 5,712,335 A | * 1/1998 | Tsuda et al. | ................. 524/269 |

FOREIGN PATENT DOCUMENTS

| | | | |
|---|---|---|---|
| EP | 0 438 886 A1 | 7/1991 | |
| EP | 1167616 A1 | * 1/2002 | ........ D06M/13/144 |
| JP | 48-8606 | 3/1973 | |
| JP | 51-3767 | 2/1976 | |
| JP | 7-157335 | 6/1995 | |
| JP | 7-257942 | 10/1995 | |
| JP | 10-182978 | 7/1998 | |
| JP | 10-265242 | 10/1998 | |
| WO | WO 00/52251 | 9/2000 | |

OTHER PUBLICATIONS

International Search Report for PCT/JP00/06257 dated Dec. 12, 2000.
Journal of Applied Poymer Science, vol. 65, 2387–2393 (1997).

* cited by examiner

Primary Examiner—Ramsey Zacharia
(74) Attorney, Agent, or Firm—Sughrue Mion, PLLC

(57) ABSTRACT

A surface treatment agent containing;
(A) a metal alkoxide, and
(B) a polymer comprising
  (B-i) a monomer having a carbon-carbon double bond and a metal alkoxide group,
  (B-ii) a fluorine-free (meth)acrylic acid derivative monomer, and
  (B-iii) a fluorine-containing compound having a functional group reactive with the metal alkoxide, or
  (B-iv) a fluorine-containing monomer having a carbon-carbon double bond,
can impart durability maintaining sufficient water- and oil-repellency and soil releasability before and after cleaning.

9 Claims, No Drawings

SURFACE-TREATMENT AGENT COMPRISING INORGANIC/ORGANIC HYBRID MATERIAL

FIELD OF THE INVENTION

The present invention relates to a surface treatment agent which imparts a superior soil release property, even after dry cleaning, to a substrate to be treated, such as a textile and has a high residence.

BACKGROUND OF INVENTION

Hitherto, various soil release treatment agents are suggested in order to impart water repellency, oil repellency and soil releasability to textiles (for example, carpets). JP-B-48-8606 discloses that the soil release property is imparted by treating fibers with a homopolymer prepared by polymerizing an unsaturated carboxylate ester having perfluoroalkyl groups at both ends. However, the soil release property imparted by this homopolymer is insufficient.

JP-B-51-3767 discloses that water repellency and oil repellency are imparted to fibers by treating fibers with a polymer prepared by copolymerizing (i) a maleate or fumarate ester having a perfluoroalkyl group at one end and having an aliphatic or aromatic group free from a fluorine atom at other end and (ii) another polymerizable unsaturated compound. Because one of end groups of the maleate or fumarate ester is free from a fluorine atom, the polymerizability is good. However, the water- and oil-repellency and the soil release property imparted by this polymer are insufficient.

U.S. Pat. No. 3,594,353 discloses that water repellency and soil release property against oil are imparted to fibers by treating fibers with a polymer prepared by homopolymerizing an itaconate ester having a perfluoroalkyl group at both ends or one end or by copolymerizing the itaconate ester with another polymerizable unsaturated compound. However, the water- and oil-repellency and the soil release property imparted by this polymer are insufficient.

J. Applied Polymer Science, 65 (12), 2387 (1997) discloses that the water repellency and the glass protection are imparted by providing a hydrophobic inorganic-organic hybrid material thin film on a glass plate. However, the water- and oil-repellency and the soil release property of this hybrid material are insufficient.

None of conventionally proposed soil release agents has sufficient water- and oil-repellency, soil releasability and cleaning durability.

Initial water- and oil-repellency and soil releasability, immediately after the treatment, of carpets treated with the above conventional methods are superior to those of untreated carpets. However, the initial water- and oil-repellency and soil releasability of the treated carpets are insufficient and, additionally, the cleaning durability of the treated carpets is insufficient.

SUMMARY OF INVENTION

An object of the present invention is to provide a treatment agent (for example, a treatment agent for carpet) which imparts durability maintaining sufficient water repellency, oil repellency and soil releasability before and after cleaning.

The present invention provides a surface treatment agent, wherein, when a fiber is treated with the surface treatment agent, the treated fiber has following characteristics (1) to (3):

(1) in a soil release test, a numerical value, after cleaning, of soil release rate shown in the following equation is at least 30%, $$\text{Soil release rate } (\%) = 100 \times (\Delta E_N - \Delta E_{Tn})/\Delta E_N$$

$\Delta E_N$: Color difference of untreated carpet after soil release test, $\Delta E_{Tn}$: Color difference of carpet treated with the surface treatment agent after soil release test (n: number of cleaning (n is an integer of 1 to 20)), (2) in a surface analysis of a coating film by an IR-ATR method, a numerical value of a residual rate, after cleaning, of the surface treatment agent shown in the following equation is at least 10%, $$\text{Residual rate } (\%) = 100 \times (A_2/A_1)$$

$A_1$: IR intensity ratio before cleaning, $A_2$: IR intensity ratio after cleaning, and (3) a Knoop hardness (KH) of the surface treatment agent is at least 5.

The present invention provides a surface treatment agent comprising;

(A) a metal alkoxide, and
(B) a polymer comprising
   (B-i) a monomer having a carbon-carbon double bond and a metal alkoxide group,
   (B-ii) a fluorine-free (meth)acrylic acid derivative monomer, and
   (B-iii) a fluorine-containing compound having a functional group reactive with the metal alkoxide, or
   (B-iv) a fluorine-containing monomer having a carbon-carbon double bond.

Furthermore, the present invention provides a surface treatment agent comprising;

(A) a metal alkoxide, and
(C) a polymer comprising
   (C-i) a fluorine-free (meth)acrylic acid derivative monomer, and
   (C-ii) a fluorine-containing monomer having a carbon-carbon double bond.

Additionally, the present invention provides a surface treatment agent comprising;

(A) a metal alkoxide,
(D) a polymer comprising
   (D-i) a fluorine-free (meth)acrylic acid derivative monomer, and
(E) a fluorine-containing compound having a functional group reactive with the metal alkoxide.

DETAILED DESCRIPTION OF THE INVENTION

The polymer (B) is a copolymer which comprises:
(B-i) a monomer having a carbon-carbon double bond and a metal alkoxide group,
(B-ii) a fluorine-free (meth)acrylic acid derivative monomer, and
(B-iii) a fluorine-containing compound having a functional group reactive with the metal alkoxide, or
(B-iv) a fluorine-containing monomer having a carbon-carbon double bond.

The polymer (C) is a copolymer which comprises:
(C-i) a fluorine-free (meth)acrylic acid derivative monomer, and (C-ii) a fluorine-containing monomer having a carbon-carbon double bond.

The polymer (D) is a homopolymer or copolymer which comprises:

(D-i) a fluorine-free (meth)acrylic acid derivative monomer.

The fluorine-free (meth)acrylic acid derivative monomer (B-ii) in the polymer (B), the fluorine-free (meth)acrylic acid derivative monomer (C-i) in the polymer (C), and the fluorine-free (meth)acrylic acid derivative monomer (D-i) in the polymer (D) are similar.

The fluorine-containing monomer having the carbon-carbon double bond (B-iv) in the polymer (B), and the fluorine-containing monomer having the carbon-carbon double bond (C-ii) in the polymer (C) are similar.

The fluorine-containing compound having the functional group reactive with the metal alkoxide (B-iii) in the polymer (B), and the fluorine-containing compound having the functional group reactive with the metal alkoxide (E) are similar.

A weight-average molecular weight of the polymers (B), (C) and (D) may be from 5,000 to 500,000, for example from 10,000 to 200,000 (measured by GPC).

The metal alkoxide (A) is hydrolysis polymerizing organometallic compound and has at least one alkoxy group. The metal alkoxide (A) may be a compound represented, for example, by the general formula:

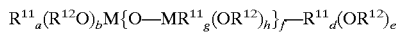

wherein each $R^{11}$ is a methacryloxy group, an acryloxy group, a vinyl group-containing organic group, an alkyl group, a vinyl group, an aryl group or an epoxy group-containing organic group, each $R^{12}$ is an alkyl group, an alkoxyalkyl group or an aryl group, M is a metal, and a is from 0 to 3, b is from 0 to 4, a+b=2 to 4, d is 1 or 0, e is 1 or 0, d+e=1, f is from 0 to 10, for example, from 0 to 4, g is from 0 to 3, h is from 0 to 3, g+h=1 to 3, and at least one of b, e and h is at least 1.

The metal alkoxide (A) may be a compound represented, for example, by the general formula:

$(R^{11})_n M(OR^{12})_m$ wherein $R^{11}$ is a methacryloxy group, an acryloxy group, a vinyl group-containing organic group, an alkyl group, a vinyl group, an aryl group or an epoxy group-containing organic group, $R^{12}$ is an alkyl group, an alkoxyalkyl group or an aryl group, M is a metal, m is from 2 to 5, in particular 3 or 4, n is from 0 to 2, in particular 0 or 1, and m+n is from 3 to 5, in particular 4.

The number of alkoxy groups in the metal alkoxide (A) may be from 1 to 12, for example from 1 to 4.

The number of carbon atoms in the alkyl group ($R^{11}$ and $R^2$) is, for example, from 1 to 6. The number of carbon atoms in the aryl group is, for example, from 6 to 18. The number of carbon atoms in the vinyl group-containing organic group and the epoxy group-containing organic group is, for example, from 2 to 6. Examples of the vinyl group-containing organic group include an vinyl group. Examples of the epoxy group-containing organic group include a glycidyl group. In the alkoxyalkyl group, the number of carbon atoms in the alkoxy group may be from 1 to 6, for example, and the number of carbon atoms in the alkyl group may be from 1 to 6.

Examples of M (metal) include silicon (Si), titanium (Ti), aluminium (Al), zirconium (Zr), tin (Sn) and iron (Fe).

Examples of the metal alkoxide (A) include tetraethoxysilane [$Si(OCH_2CH_3)_4$] (functionality of 4), methyltriethoxysilane [$CH_3Si(OCH_2CH_3)_3$] (functionality of 3), dimethyldiethoxysilane [$(CH_3)_2Si(OCH_2CH_3)_2$] (functionality of 2), trimethylethoxysilane [$(CH_3)_3SiOCH_2CH_3$] (functionality of 1), and ethoxysiloxane oligomer [$(CH_3CH_2O)_3Si\mathrm{-}\{(O\mathrm{-}Si(OCH_2CH_3)_2)\}_n\mathrm{-}(OCH_2CH_3)$] (n=1 to 4) (functionality of 6 to 12).

The monomer having the carbon-carbon double bond and the metal alkoxide group (B-i) may have a metal alkoxide group having at least one (for example, three) alkoxy group.

The metal alkoxide group may be, for example, of the formula:

wherein M is a metal such as Si, Ti, Al, Zn, Sn and Fe, $R^3$ is an alkyl group having 1 to 4 carbon atoms, and n is from 1 to 3.

The monomer having the carbon-carbon double bond and the metal alkoxide group (B-i) may be compounds represented by the formulas:

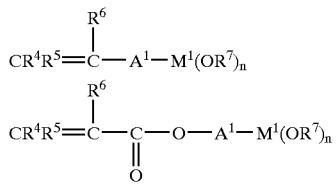

wherein $R^4$, $R^5$, $R^6$ and $R^7$ are, the same or different, a hydrogen atom or an alkyl group having 1 to 4 carbon atoms, $A^1$ is a direct bond or divalent organic group, $M^1$ is a metal such as Si, Ti, Al, Zn, Sn and Fe, and n is from 1 to 3.

The monomer having the carbon-carbon double bond and the metal alkoxide group (B-i) include an alkoxysilyl group-containing monomer and an alkoxytitan group containing monomer.

Examples of the alkoxysilyl group-containing monomer are, for example, are as follows:

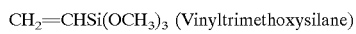

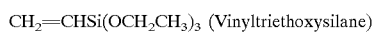

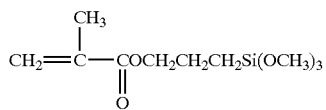

(3-methacroxypropyltrimethoxysilane)

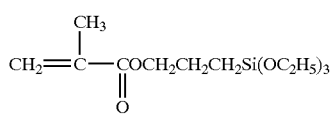

(3-methacroxypropyltriethoxysilane)

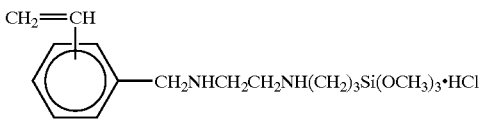

(N-[2-(Vinylbenzylamino)ethyl]-3-aminopropyltrimethoxysilane hydrochloride)

Examples of the alkoxytitan group-containing monomer are, for example, are as follows:

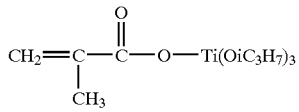

(titan methacrylate isopropoxide).

The amount of the monomer having the carbon-carbon double bond and the metal alkoxide group (B-i) may be from is from 0.1 to 200 parts by weight, for example, from 50 to 100 parts by weight, based on 100 parts by weight of the metal alkoxide (A).

The fluorine-free (meth)acrylic acid derivative monomers (B-ii), (C-i) and (D-i) have excellent adherence to the substrate to be treated, even if the carpet is cleaned. The fluorine-free (meth)acrylic acid derivative monomer does not contain (meth)acrylic acid itself.

Examples of the fluorine-free (meth)acrylic acid derivative monomer include a (meth)acrylate, and a (meth)acrylic group-containing (acrylic group: $CH_2=CH-$) nitrogen compound [for example, (meth)acrylamide and (meth)acrylonitrile].

The (meth)acrylate may be selected from the group consisting of alkyl(meth)acrylate, polyalkyleneglycol(meth)acrylate, 3-chloro-2-hydroxypropyl(meth)acrylate and glycerol mono(meth)acrylate. The (meth)acrylate may be used alone or in combination of at least two.

The alkyl(meth)acrylate has, for example, the following structure:

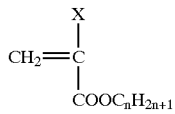

wherein X is a hydrogen atom or a methyl group, and n is from 1 to 22 (for example, from 1 to 10).

Specific examples of the (meth)acrylate are methyl(meth)acrylate, ethyl(meth)acrylate, propyl(meth)acrylate, n-butyl(meth)acrylate, t-butyl(meth)acrylate, n-octyl(meth)acrylate, 2-ethylhexyl(meth)acrylate, dodecyl(meth)acrylate, cetyl(meth)acrylate, stearyl(meth)acrylate and behenyl(meth)acrylate.

The polyalkyleneglycol(meth)acrylate has, for example, the following structure: $CH_2=CR^{21}COO-(R^{22}-O)_n-R^{23}$ wherein $R^{21}$ and $R^{23}$ are a hydrogen atom or a methyl group, $R^{22}$ is an alkylene group having 2 to 6 carbon atoms, and n is an integer of 1 to 50.

Specific examples of the polyalkyleneglycol(meth)acrylate are 2-hydroxyethyl(meth)acrylate,

wherein n is 2, 5 or 8.

3-Chloro-2-hydroxypropyl(meth)acrylate is represented by the formula:

wherein $R^{31}$ is a hydrogen atom or a methyl group.

Glycerol mono(meth)acrylate is represented by the formula:

wherein $R^{41}$ is a hydrogen atom or a methyl group.

The (meth)acrylic group-containing nitrogen compound includes (meth)acrylamide, N,N-dimethylacrylamide, (meth)acrylonitrile, dimethylaminoethyl(meth)acrylate, diethylaminoethyl(meth)acrylate, diacetoneacrylamide, N-methylolacrylamide, N,N-dimethylaminoethyl acrylate, N,N-dimethylaminoethylmethacrylate, 3-chloro-2-hydroxypropyl methacrylate, trimethylammonium ethyl methacrylate chloride, methacryloxyloxyethyltrimethylammonium chloride, 2-hydroxy-3-methacryloxyloxypropyltrimethylammonium chloride, (meth)acrylate having a blocked isocyanate group, (meth)acrylate having at least one urethane or urea linkage.

The amount of the fluorine-free (meth)acrylic acid derivative monomers (B-ii), (C-i) and (D-i) may be from 0.1 to 200 parts by weight, for example, from 0.25 to 10 parts by weight, based on 100 parts by weight of the metal alkoxide (A).

The fluorine-containing compounds having functional group reactive with metal alkoxide (B-iii) and (E) may be, for example, a compound:

wherein

Rf is a fluoroalkyl group, $X^1$ is a reactive group selected from the group consisting of an alkoxysilane group, a carboxyl group, a hydroxyl group, an epoxy group, a phosphate group, a halogenated silyl group, or a sulfonate group, an isocyanate group and a blocked isocyanate group.

The number of carbon atoms in the Rf group may be from 3 to 21, in particular, from 7 to 17. The Rf group (the fluoroalkyl group) may be $CF_3(CF_2)_nCH_2CH_2-$ ($n \geq 0$).

The fluorine-containing compounds having functional group reactive with metal alkoxide (B-iii) and (E) may be, in particular, Rf-OH or Rf-Si(OR$^{31}$)$_3$, wherein each $R^{31}$ is independently a $C_{1-20}$ alkyl group.

The fluorine-containing compounds having functional group reactive with metal alkoxide (B-iii) and (E) may be a silane, an alcohol, a chlorosilane, an epoxy and a phosphate ester.

Examples of the fluorine-containing compound having functional group reactive with metal alkoxide include the followings:

2-perfluorooctylethyltriethoxysilane [$CF_3CF_2(CF_2CF_2)_3CH_2CH_2-Si(OCH_2CH_3)_3$],
2-perfluorodecylethyltriethoxysilane [$CF_3CF_2(CF_2CF_2)_4CH_2CH_2-Si(OCH_2CH_3)_3$],
2-perfluorododecylethyltriethoxysilane [$CF_3CF_2(CF_2CF_2)_5CH_2CH_2-Si(OCH_2CH_3)_3$],
2-perfluorotetradecylethyltriethoxysilane [$CF_3CF_2(CF_2CF_2)_6CH_2CH_2-Si(OCH_2CH_3)_3$],
2-perfluorooctylethanol [$CF_3CF_2(CF_2CF_2)_3CH_2CH_2OH$],
2-perfluorodecylethanol [$CF_3CF_2(CF_2CF_2)_4CH_2CH_2OH$], 2-perfluorododecylethanol [$CF_3CF_2(CF_2CF_2)_5CH_2CH_2OH$],
2-perfluorotetradecylethanol [$CF_3CF_2(CF_2CF_2)_6CH_2CH_2OH$],
2-perfluorooctylethyltrichlorosilane [$CF_3CF_2(CF_2CF_2)_3CH_2CH_2\text{—}SiCl_3$],
2-perfluorodecylethyltrichlorosilane [$CF_3CF_2(CF_2CF_2)_4CH_2CH_2\text{—}SiCl_3$],
2-perfluorododecylethyltrichlorosilane [$CF_3CF_2(CF_2CF_2)_5CH_2CH_2\text{—}SiCl_3$],
2-perfluorotetradecylethyltrichlorosilane [$CF_3CF_2(CF_2CF_2)_6CH_2CH_2\text{—}SiCl_3$],
3-perfluorooctyl-1,2-epoxypropane [$CF_3CF_2(CF_2CF_2)_3\text{—}Gly$],
3-perfluorodecyl-1,2-epoxypropane [$CF_3CF_2(CF_2CF_2)_4\text{—}Gly$],
3-perfluorododecyl-1,2-epoxypropane [$CF_3CF_2(CF_2CF_2)_5\text{—}Gly$],
3-perfluorotetradecyl-1,2-epoxypropane [$CF_3CF_2(CF_2CF_2)_6\text{—}Gly$], (Gly is a glycidyl group.)
2-perfluorooctylethylphosphate [$CF_3CF_2(CF_2CF_2)_3\text{—}CH_2CH_2O\}_m\text{—}PO\text{—}(OH)_{3-m}$],
2-perfluorodecylethylphosphate [$CF_3CF_2(CF_2CF_2)_4\text{—}CH_2CH_2O\}_m\text{—}PO\text{—}(OH)_{3-m}$],
2-perfluorododecylethylphosphate [$CF_3CF_2(CF_2CF_2)_5\text{—}CH_2CH_2O\}_m\text{—}PO\text{—}(OH)_{3-m}$], and
2-perfluorotetradecylethylphosphate [$CF_3CF_2(CF_2CF_2)_6\text{—}CH_2CH_2O\}_m\text{—}PO\text{—}(OH)_{3-m}$], (m=1 to 3).

The amount of the fluorine-containing compounds having functional group reactive with metal alkoxide (B-iii) and (E) may be from 0.1 to 50 parts by weight, for example, from 1.0 to 5.0 parts by weight, based on 100 parts by weight of the metal alkoxide (A).

The fluorine-containing monomers having carbon-carbon double bond (B-iv) and (C-ii) may be a fluorine-containing (meth)acrylate, a fluorine-containing maleate or a fluorine-containing fumarate.

The fluorine-containing (meth)acrylate has, for example, the following structure:

General Formula (1)

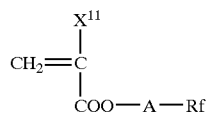

wherein

Rf is a polyfluoroalkyl group having 6 to 16 carbon atoms or a perfluoropolyether group, A is an alkylene group having 1 to 4 carbon atoms,

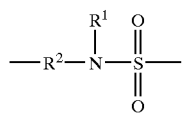

(wherein $R^1$ is an alkyl group having 1 to 4 carbon atoms, and $R^2$ is an alkylene group having 1 to 4 carbon atoms.), or

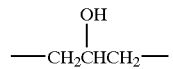

$X^{11}$ is an hydrogen atom or a methyl group.

The polyfluoroalkyl group (Rf group) may be a perfluoroalkyl group.

Specific examples of the perfluoropolyether group are as follows.

wherein n is an integer of 3 to 30,

wherein n is an integer of 2 to 30 and m is an integer of 3 to 70,

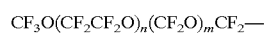

wherein n is an integer of 2 to 40 and m is an integer of 4 to 70,

wherein n is an integer of 3 to 30.

A number-average molecular weight of the perfluoropolyether group (measured by $^{19}$F-NMR) is preferably in the range between 500 and 5,000.

The fluorine-containing (meth)acrylate may be:

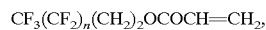

or

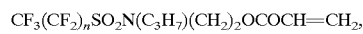

wherein n is from 0 to 10.

Specific examples of the fluorine-containing (meth) acrylate are as follows:

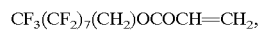

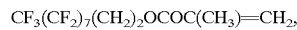

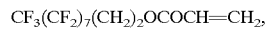

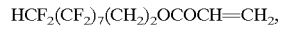

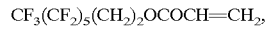

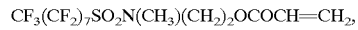

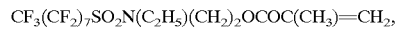

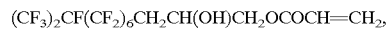

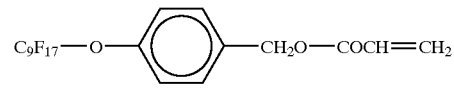

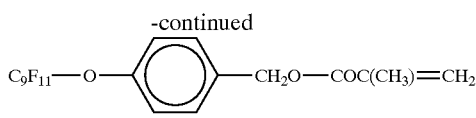

and

F(CF(CF$_3$)CF$_2$O)$_{10}$CF$_2$CF$_2$—COOCH$_2$CH$_2$CH=CH$_2$.

The fluorine-containing maleate may be of the formula:

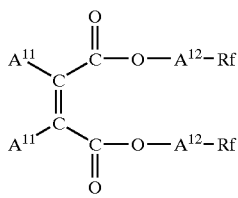

wherein
Rf is a perfluoroalkyl group having 3 to 21 carbon atoms,
$A^{11}$ is a hydrogen atom or an alkyl group having 1 to 4 carbon atoms, and
$A^{12}$ is an alkylene group having 1 to 4 carbon atoms.

The fluorine-containing fumarate may be of the formula:

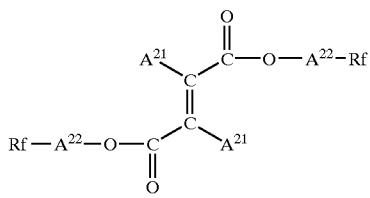

wherein
Rf is a perfluoroalkyl group having 3 to 21 carbon atoms,
$A^{21}$ is a hydrogen atom or an alkyl group having 1 to 4 carbon atoms, and
$A^{22}$ is an alkylene group having 1 to 4 carbon atoms.

The amount of the fluorine-containing monomers having carbon-carbon double bond (B-iv) and (C-ii) may be from 0.1 to 50 parts by weight, for example, from 1.0 to 5.0 parts by weight, based on 100 parts by weight of the metal alkoxide (A).

The surface treatment agent of the present invention is a composition for an inorganic-organic hybrid material.

The inorganic-organic hybrid material is formed from an organic component and an inorganic component. The organic component is the fluorine-free (meth)acrylic acid derivative monomers (B-ii), (C-i) and (D-i), the fluorine-containing compounds having functional group reactive with metal alkoxide (B-iii) and (E), and the fluorine-containing monomers having carbon-carbon double bond (B-iv) and (C-ii). The inorganic component is the metal alkoxide (A) and the monomer having carbon-carbon double bond and metal alkoxide group (B-i).

The inorganic-organic hybrid material having a structure wherein a polymer is dispersed in a metal oxide (particularly $MO_2$ (M is a metal atom))—containing three dimensional microstructural material (hereinafter abbreviated as "microstructural material") can be obtained from a composition for inorganic-organic hybrid material. The metal oxide (for example $MO_2$)—containing microstructural material is formed by hydrolysis and condensation by a sol-gel method of the metal alkoxide (that is, the metal alkoxide (A) and the monomer having carbon-carbon double bond and metal alkoxide group (B-i)). The inorganic-organic hybrid material is formed wherein the polymer (that is, the polymer (B) or (C) or (D)) is dispersed in the metal oxide-containing microstructural material. A covalent bond is formed between the metal alkoxide (A) and the polymer (B). A hydrogen bond is formed between the metal alkoxide (A) and the polymer (C). A covalent bond is not formed between the metal alkoxide (A) and the polymer (D).

The inorganic-organic hybrid material is suitable for a surface treatment agent, particularly a treatment agent for a textile, and has excellent soil release durability and transparency and is hydrophobic.

A coated film of the inorganic-organic hybrid material is formed on a substrate. The substrate may be a polymeric material. The substrate may be, for example, in the form of a film, a fiber and a cloth.

The coated film of the inorganic-organic hybrid material may comprise an uneven layer having the whole surface which is roughened by forming microscopic unevenness. A surface roughness of the uneven layer of the coated film may be a maximum height ($R_{max}$) of 0.001 to 100 μm. A thickness of the coated film may be from 0.01 to 100 μm.

The Knoop hardness (KH) of the coated film formed from the inorganic-organic hybrid materials is at least 5. The Knoop hardness may be, for example, at least 6, in particular, at least 8. The Knoop hardness is measured by means of Terasawa type micro hardness meter (SM-2 manufactured by Taiyo Tester Co., Ltd.).

The inorganic-organic hybrid material may have a contact angle of water of at least 100 degree.

Components selected from the metal alkoxide (A), the monomer having carbon-carbon double bond and metal alkoxide group (B-i), the fluorine-free methacrylic acid derivative monomers (B-ii), (C-i) and (D-i) and the fluorine-containing compounds having functional group reactive with metal alkoxide (B-iii) and (E) and the fluorine-containing monomers (B-iv) and (C-ii) are hydrolyzed in an aqueous medium in the presence of a catalyst (for example, an acid or a base) to give a hydrolysed product (that is, the inorganic-organic hybrid material). The hydrolysed product is dissolved or dispersed in a medium (water or an organic solvent), then an initiator (and, if necessary, a crosslinking agent) is added to give a hybrid material/medium mixture. The mixture can be obtained by adding heat or light (for example, UV light).

Examples of the organic solvent include alcohols (for example, methanol and ethanol), ethers (for example, benzoin methyl ether) and amides (for example, N,N-dimethylformamide). Examples of the initiator include peroxides (for example, ammonium peroxodisulfate and ammonium persulfate), benzoin methyl ether, benzoin ethyl ether. Examples of the crosslinking agent include bisacrylamides (for example, N,N-methylene-bis-acrylamide). An emulsifier, a pH adjuster and the like may be employed in order to disperse the inorganic-organic hybrid-material in water.

Any of the following emulsifiers may be employed;
for example, anionic surface active agents such as an alkyl sulfate ester salt, an alkyl aryl sulfate ester salt, an alkyl phosphate ester salt and a fatty acid salt;
cationic surface active agents such as a alkylamine salt and a quaternary alkyl amine salt;
nonionic surface active agents such as a polyoxyethylene alkyl ether, a polyoxyethylene alkyl aryl ether and a block-type polyether; and
amphoteric surface active agents such as a carboxylic acid-type agent (for example, amino acid-type, betaine-type, etc) and a sulfonic acid-type agent. These emulsifiers may be employed alone or in combination of at least two.

In the case that the copolymer contains an acidic group such as a carboxyl group or a carboxylic acid, it is preferable to adjust pH by adding at least one basic compound after condensation polymerization of the metal alkoxide (A) and the monomer having carbon-carbon double bond and metal alkoxide group (B-i). In the case that the copolymer has a basic group such as an amino group or an amine imide group in the copolymer, it is preferable to adjust pH by adding at least one acidic compound after condensation polymerization of the metal alkoxide (A) and the monomer having carbon-carbon double bond and metal alkoxide group (B-i). In the case that the copolymer has the acidic group and the basic group, the hydrophilic property of the resultant copolymer is enhanced, and the dispersibility of the polymer can be improved, by adjusting pH by way of adding at least one acidic compound or at least one basic compound depending on the content of these acidic and basic groups, after condensation polymerization of the metal alkoxide (A) and the monomer having carbon-carbon double bond and metal alkoxide group (B-i).

Examples of the above-mentioned basic compound include amines such as ammonia, methylamine, dimethylamine, trimethylamine, ethyl amine, diethylamine, triethylamine, ethanolamine, diethanolamine, dimethyl amino ethanol; and alkali metal hydroxides such as potassium hydroxide and sodium hydroxide. Examples of the above-mentioned acidic compound include inorganic acids such as hydrochloric acid, phosphoric acid, sulphuric acid and nitric acid; and organic acids such as formic acid, acetic acid, propionic acid, lactic acid, oxalic acid, citric acid, adipic acid, (meth)acrylic acid, maleic acid, fumaric acid and itaconic acid. The pH value adjusted may be usually from 6 to 10, more preferably from 7 to 8.

Although the aqueous medium in the aqueous dispersion essentially comprises water, in some cases an organic solvent such as alcohols may be contained up to approximately several percentage by weight.

In the present invention, it is preferable to employ the following metal chelate compound (F) and β-keto compound (G).

The metal chelate compound (F) comprises at least one metal chelate compound selected from the group consisting of the compounds represented by the following general formulas:

$$Zr(OR^{51})_p(R^{52}COCHCOR^{53})_{4-p},$$

$$Ti(OR^{51})_q(R^{52}COCHCOR^{53})_{4-q},$$

and $$Al(OR^{51})_r(R^{52}COCHCOR^{53})_{3-r},$$

wherein $R^{51}$ and $R^{52}$ are, the same or different, an alkyl group having 1 to 6 carbon atoms, and $R^{53}$ is an alkyl group having 1 to 5 carbon atoms or an alkoxyl group having 1 to 16 carbon atoms, and/or partially hydrolysed compound thereof.

It is believed that the metal chelate compound (F) performs a function of accelerating a condensation reaction during the condensation polymerization of the metal alkoxide (A) and the monomer having carbon-carbon double bond and metal alkoxide group (B-i).

In each of the formulas representing the metal chelate compound (F), the alkyl groups $R^{51}$ and $R^{52}$ having 1 to 6 carbon atoms may be a linear or branched alkyl group such as a methyl group, an ethyl group, an n-propyl group, an isopropyl group, an n-butyl group, an isobutyl group, a sec-butyl group, a t-butyl group, an n-pentyl group and an n-hexyl group. For the $R^{53}$ group, the alkyl group having 1 to 5 carbon atoms may be a linear or branched alkyl group such as a methyl group, an ethyl group, an n-propyl group, an isopropyl group, an n-butyl group, an isobutyl group, a sec-butyl group, an t-butyl group and an n-pentyl group, and the alkoxyl group having 1 to 16 carbon atoms may be a methoxy group, an ethoxy group, an n-propoxy group, an isopropoxy group, a n-butoxy group, an isobutoxy group, a sec-butoxy group, a t-butoxy group, a lauryl group and a stearyl group. In the case that the compound in each of the above-mentioned formulas has at least two of $R^{51}$, $R^{52}$ and/or $R^{53}$ groups, they may be the same or may be different from each other.

Examples of the metal chelate compound (F) include zirconium chelate compounds such as zirconium tri-n-butoxy ethyl acetoacetate, zirconium di-n-butoxy bis(ethyl acetoacetate), zirconium n-butoxy tris(ethyl acetoacetate), zirconium tetrakis(n-propyl acetoacetate), zirconium tetrakis(acetyl acetoacetate) and zirconium tetrakis(ethyl acetoacetate); titanium chelate compounds such as titanium diisopropoxy bis(ethyl acetoacetate), titanium diisopropoxy bis(acetyl acetoacetate) and titanium diisopropoxy bis (acetyl acetate); aluminum chelate compounds such as aluminum diisopropoxy ethyl acetoacetate, aluminum diisopropoxy acetyl acetate, aluminum isoprpoxy bis(ethyl acetoacetate), aluminum isoprpoxy bis(acetyl acetate), aluminum tris(acetyl acetate), aluminum tris(ethyl acetoacetate) and aluminum monoacetylacetate bis(ethyl acetoacetate).

Among the above-mentioned metal chelate compounds (F), zirconium tri-n-butoxy ethyl acetoacetate, titanium diisopropoxy bis(acetyl acetate), aluminum diisopropoxy ethyl acetoacetate and aluminum tris(ethyl acetoacetate) are preferable. In the present invention, the metal chelate compound (F) may be employed alone or in combination of at least two.

The blending ratio of the metal chelate compound (F) is usually from 0.01 to 50 parts by weight, preferably from 0.1 to 50 parts by weight, more preferably from 0.5 to 10 parts by weight, based on 100 parts by weight of the metal alkoxide (A). Soil releasability is further improved by employing the metal chelate compound (F) by using the above-mentioned blending ratio.

The β-keto compound (G) comprises at least one compound selected from β-diketones and/or β-keto esters represented by the following general formula, and provides a function of storage stabilizer for the surface treatment agent of the present invention;

$$R^{62}COCH_2COR^{63}$$

wherein $R^{62}$ and $R^{63}$ are the same as $R^{52}$ and $R^{53}$ respectively in the above-mentioned each general formula representing the metal chelate compound (F).

It is believed that the β-keto compound (G). coordinates with the metal atom in the metal chelate compound (F) when an aqueous dispersion is prepared and it suitably prevents the acceleration function of the metal chelate compound for the condensation reaction of the metal alkoxide (A) and the monomer having carbon-carbon double bond and metal alkoxide group (B-i) so that it further stabilizes the resultant composition during storage.

Examples of the β-keto compound (G) include acetylacetone, methyl acetoacetate, ethyl acetoacetate, n-propyl acetoacetate, isopropyl acetoacetate, n-butyl acetoacetate, isobutyl acetoacetate, sec-butyl acetoacetate, t-butyl acetoacetate, 2,4-hexanedione, 2,4-heptanedione, 3,5-heptanedione, 2,4-octanedione, 3,5-octanedione, 2,4-nonanedione, 3,5-nonanedione and 5-methyl-2,4-hexanedione. Among above-mentioned β-keto compounds (G), acetylacetone and ethyl acetoacetate are particularly preferable. In the present invention, the β-keto compound (G) may be employed alone or in combination of at least two. A blending ratio of β-keto compound (G) is at least 2 moles, preferably from 3 to 20 moles, more preferably from 4 to 15 moles, based on 1 mole of the metal chelate compound (F).

The aqueous dispersion of the surface treatment agent of the present invention may comprise the metal chelate compound (F) and the β-keto compound (G) and, if required, may comprise other additives. At least one colloidal silica and/or colloidal alumina (hereinafter collectively referred to as "colloidal additive (H)") may be added in order to improve the soil releasability of fiber.

The above-mentioned colloidal silica is a dispersion liquid wherein a high-purity silicic anhydride is dispersed in water and/or a hydrophilic organic solvent. An average particle diameter of the colloidal silica is usually from 5 nm to 100 nm and preferably from 10 nm to 50 nm, and solid concentration of the colloidal silica is usually approximately from 10 to 40% by weight. Examples of the colloidal silica include Snow tex, methanol silica sol, isopropanol silica sol (manufactured by Nissan Chemical Industries, Ltd.).

The above-mentioned colloidal alumina is an alumina sol in aqueous dispersing medium having pH of from 2.5 to 6 or an alumina sol in a hydrophilic organic solvent dispersing medium. The average particle diameter of the colloidal alumina is usually from 5 to 200 nm, preferably from 10 to 100 nm, and the solid concentration is usually approximately from 5 to 25% by weight. As alumina, for example, synthetic alumina, boehmite and pseudo boehmite may be employed. Colloidal alumina of this type is commercially available with trade names such as ALUMINA SOL-100, ALUMINA SOL-200 and ALUMINA SOL-520 (manufactured by Nissan Chemical Industries, Ltd.). In the present invention, the colloidal additive (H) may be employed alone or in combination of at least two. A blending ratio of colloidal additive (H) is usually at most 30 parts by weight, preferably at most 20 parts by weight, for example, from 0.1 to 20 parts by weight, as expressed in the solid content, based on 100 parts by weight of the copolymer (that is, the copolymers (B), (C) and (D)).

After the hybrid material/medium mixture is applied on a surface of a substrate, a curing process may be applied. The curing may be performed by means of heat (for example, application of heat of from 100 to 150° C.) etc.

An inorganic-organic hybrid material of the present invention (the surface treatment agent) may be applied to a substrate (that is, a substrate to be treated) by a conventionally known method. The surface treatment agent is usually diluted with an organic solvent or water and deposited on the surface of the substrate to be treated (for example, a carpet) by known methods such as a dipping application, a spray coating application and a foam coating application. If necessary, a carpet base fabric or a carpet yarn may be treated with steam before the application of the treatment agent.

Additives such as other water repellents and oil repellents, moth proofing agents, softening agents, antimicrobial agents, flame retardants, antistatic additives, coating fixing agents and crease resistant agents may be added to the surface treatment agent of the present invention. In the case of the dipping application, a concentration of the inorganic-organic hybrid material in a dipping liquid may be from 0.05 to 30% by weight. In the case of the spray application, the concentration of the inorganic-organic hybrid material in the treatment liquid may be from 0.1 to 5% by weight.

The substrate to be treated with the surface treatment agent of the present invention may be a textile. It is especially preferable that the substrate is a carpet. Various examples may be mentioned as the textile. Examples of the textile include vegetable fibers and animal fibers such as cotton, hemp, sheep wool and silk, synthetic fibers such as polyamide, polyester, polyvinylalcohol, polyacrylonitrile, polyvinyl chloride and polypropylene, semi-synthetic fibers such as rayon and acetate, inorganic fibers such as fiberglass, carbon fiber and asbestos fiber or mixture of these above-mentioned fibers. Superior resistance against a cleaning solution and mechanical brushing of the present treatment agent enables the treatment agent of the present invention preferably to be applied for carpets of nylon and/or polypropylene.

The textile may be in any form such as a fiber, a yarn or a fabric. In the case that the carpet is treated with the surface treatment agent of the present invention, the carpet may be manufactured from fibers or yarns after the fibers or the yarns were treated with the surface treatment agent. Alternatively, an already prepared carpet may be treated with the surface treatment agent.

Examples of the substrate to be treated with the surface treatment agent of the present invention include glass, paper, wood, leather, fur, asbestos, brick, cement, metal, building stone, concrete, oxide, ceramics, plastics, painted surface, plaster, a building material, rubber, light guide and contact lens, in addition to the textile.

Examples of the substrate to be treated with the surface treatment agent of the present invention include a member for image formation instrument. Examples of the image formation instrument include a copier, a printer, a facsimile and combined machine thereof. A shape of the member may be various shape such as a roll, a blade and a belt. Non-limiting specific examples of the member include a photo conductor, a charged roll, a charged brush, a charged blade, a developing roll, an intermediate transfer roll, an intermediate transfer belt, a paper transfer roll, a transfer fixation belt, a fixation roll, a fixation belt, a pressurizing roll, a pressurizing belt, a paper feedroll, a paper feed belt, a separation nail, a cleaning blade and cleaning roll. The member is not limited to a member for an electronic photo-type image formation instrument using a powder toner, and the surface treatment agent of the present invention can be used for an image formation instrument member for various methods such as a toner jet method, a liquid toner method, an ink jet method, a sublimation method and a thermal transfer method. The surface treatment agent of the present invention can be used also as a reflection preventing agent for a liquid crystal display instrument and a display surface and the like, and a surface treatment agent for a light conduit, a interlayer insulation film, a heat exchanger of air conditioner and the like.

When the carpet fibers are treated with the surface treatment agent of the present invention, a numerical value of soil release rate of at least 30% after cleaning in a soil release test, which is shown in the following equation, can be achieved:

Soil release rate (%)=100×($\Delta E_N - \Delta E_{Tn}$)/$\Delta E_N$ $\Delta E_N$: Color difference of untreated carpet after soil release test, and $\Delta E_{Tn}$: Color difference of carpet treated with a surface treatment agent after soil release test (n: number of cleaning (n is an integer of 1 to 20)).

The soil release test is conducted according to AATCC-TM-123-1995 and the cleaning is conducted according to a method of AATCC-TM-138-1992.

The color difference ΔE after the soil release test is represented by the equation:

$$\Delta E = [(L_1^* - L_2^*)^2 + (a_1^* - a_2^*)^2 + (b_1^* - b_2^*)^2]^{0.5}$$

wherein $L_1^*$, $a_1^*$ and $b_1^*$ are a substance color calculated in a L*a*b* system after soil release test, and $L_2^*$, $a_2^*$ and $b_2^*$ are a substance color calculated in a L*a*b* system before soil release test.

Soil release rate of at least 30%, for example 50% can be maintained at number of cleaning of 3, preferably 5, more preferably 10, further preferably 15, particularly 20.

The color of the carpet treated with the surface treatment agent has L which may be from 40 to 80, pareferably from 40 to 60, a which may be from +0.1 to −0.8, preferably from −0.1 to −0.6, and b which may be from −13 to −25, preferably from −17 to −21.

When a treatment cycle of contamination, cleaning and re-contamination is applied to the carpet, a soil release rate of preferably at least 20%, more preferably at least 30% can be maintained at the re-contamination.

When the surface treatment agent is used for the carpet fibers, a numerical value of a residual rate of the surface treatment agent shown in the following equation, which is at least 10%, in a surface analysis of a coating film by an IR-ATR method can be achieved:

$$\text{Residual rate (\%)} = 100 \times (A_2/A_1)$$

$A_1$: IR intensity ratio before cleaning
$A_2$: IR intensity ratio after cleaning.
The IR intesity ratio can be defined as IR intesity ratio=(absorption peak area of Si-O-Si group)/(absorption peak area of amide group of nylon)

The absorption peak area of Si—O—Si group is a peak area calculated at integration range of 1090 to 981 cm$^{-1}$. The absorption peak area of amide group of nylon is a peak area calculated at integration range of 1673 to 1583 cm$^{-1}$.

A numerical value of residual rate of the coating film after cleaning may be at least 10%, for example at least 10%, particularly at least 30%.

A refractive index of the coating film may be at most 1.35, for example, at most 1.32, particularly at most 1.30. The refractive index is measured using a white color light refractometer (Abbe refractometer). A light converted from white light into sodium D ray using compensator is used as a light source for which the refractive index is measured.

EMBODIMENTS OF THE INVENTION

The present invention will be illustrated hereinafter by showing Examples and Comparative Examples, but these example are not intended to be any limitation of the present invention.

The term "part" represents part by weight, unless specified.

The examinations were performed as follows.
Knoop Hardness
A coated film of an inorganic-organic hybrid material (thickness: 1 μm) is formed on a glass plate. A Knoop hardness of the coated film is measured by Terasawa type micro hardness meter (SM-2 manufactured by Taiyo Tester Co., Ltd.).

Water Repellency

A droplet of isopropyl alcohol/water mixture liquid having the composition shown in Table I is gently placed on a surface of a carpet fabric. Water repellency is represented by a maximum content of isopropyl alcohol in the mixture liquid wherein a droplet shape is kept after three minutes.

TABLE I

| Mixture composition (volume ratio %) | |
|---|---|
| Isopropyl alcohol | Water |
| 60 | 40 |
| 50 | 50 |
| 40 | 60 |
| 30 | 70 |
| 20 | 80 |
| 10 | 90 |
| 0 | 100 |

Oil Repellency

Oil repellency is evaluated by means of AATCC-TM-118-1966. Several droplets (diameter 4 mm) of a test liquid shown in Table II are placed on 2 points of a sample cloth. After 30 seconds, the penetration state of the droplets is observed. The highest number of the oil repellency given by the examination liquid that does not exhibit the penetration is expressed as the oil repellency.

TABLE II

| Oil repellency | Test liquid | Surface tension (dynes/cm at 25° C.) |
|---|---|---|
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | Mixture liquid of 35 parts of hexadecane and 65 parts of nujol | 29.6 |
| 1 | Nujol | 31.2 |
| 0 | Inferior to 1 | — |

Soil Releasability

Soil releasability of a carpet treated with a surface treatment agent is evaluated with the following method according to AATCC-TM-123-1995.

After the carpet fabric is cut into 5.5 cm×8 cm pieces and kept to stand for 4 hours in a thermohygrostat (21° C., 65% RH), the fabric is stained with dry soil which has the following composition and then sufficiently dried. Specifically, five pieces of the treated carpet are placed under the state that a back surface of each piece is attached to an internal of a ball mill so that the treated surface of the piece is upside. 0.031 g of dry soil (dry soil was totally 6.82 g for five pieces) per surface area 1 cm$^2$ of carpet piece and 50 ceramic balls (diameter of 2.0 cm) are placed in the ball mill. The ball mill is rotated with 80 rpm for 7 minutes and 30 seconds, and the dry soil is adhered to the carpet piece surface uniformly.

The ball mill employed here is cylindrical, and has an inside bottom diameter of 12.0 cm and a height of 9.5 cm. Then excessive dry soil adhered to the surface is removed thoroughly with a home vacuum cleaner. A color difference (ΔE) of the carpet surface is measured using a color difference meter (MINOLTA CR-310).

The composition of the dry soil is as follows.

TABLE III

| Components | Weight ratio (%) |
|---|---|
| Peat moss | 38.4 |
| Cement | 18 |
| Kaolin | 18 |
| Silica | 18 |
| Carbon black | 1.15 |
| Ferric oxide (III) | 0.30 |
| Nujol | 6.25 |

Values of L, a and b are L: from 25 to 31, a: from 2.3 to 2.6, b: from 4. 2 to 4. 8.

Cleaning Method

The carpet fabric treated with the surface treatment agent is cleaned according to a method of AATCC-TM-138-1992. The details of the cleaning are as follows.

A surface of a carpet piece cut into 11 cm×11 cm square is rinsed with running water at 50° C. for one minute and squeezed with mangles (a pressure of 5mg/cm$^2$). The carpet piece is fixed on a sample pedestal of a cleaning testing machine (STAIN & CLEANING TESTER manufactured by Yoshida Seiki Seisakusyo Company) described in JIS L1023-1992 so that a rotating brush rubs the carpet pile. One percent aqueous solution of sodium lauryl sulfate (SLS) (adjusted at pH 8 with NaOH aqueous solution) (5.6 mL) adjusted at 50° C. is poured onto a carpet piece with a pipet. The rotating brush and the sample pedestal are rotated and the carpet piece is cleaned. The operation wherein the sample pedestal rotates in regular direction five revolutions, in reverse direction five revolutions, in regular direction five revolutions, and then in reverse direction five revolutions (during the rotation of the sample pedestal, the rubbing by the rotating brush is continued) is defined as one set of cleaning.

In the cleaning test, the cleaning operation is repeated five sets without adding 1% aqueous SLS solution.

The sample pedestal rotates at 20 rpm, the brush rotates at 240 rpm, and vacuum and water spray nozzle of the cleaning testing machine are not employed.

The test carpet piece is thoroughly rinsed with running water at 50° C., squeezed with mangles and dried in a hot-air drier at 105° C. for 30 minutes.

Fluorine Residual Rate

A fluorine residual rate of a carpet treated with a surface treatment agent is determined by the following method. Two hundred mg of carpet pieces before and after cleaning.are collected and processed by an oxygen flask combustion method. F$^-$ (a fluorine ion) is absorbed in water which is an absorption liquid. Then the amount of F$^-$(fluorine ion) is calculated by a fluorine ion electrode method to determine a fluorine residual rate.

Residual Rate of Surface Treatment Agent

A residual rate in a nylon film treated with a surface treatment agent is determined by the following method. The nylon films before and after cleaning are cut into pieces having a size of 5.5 cm×1.5 cm. The pieces are surface-analyzed by an IR-ATR method (FT-IR 1760X manufactured by Perkin Elmer Corp.) to determine a residual rate Synthesis Example 1

In a 100 mL flask equipped with a stirrer, a thermometer and a dropping funnel, 1.5 parts of heptadecafluoro-1,1,2,2-tetrahydrodecyl triethoxy silane [$CF_3(CF_2)_7CH_2CH_2$—$Si(OCH_2CH_3)_3$] (a fluorine-containing compound) (manufactured by Shin-Etsu Chemical Co., Ltd.) and 5 parts of methyl methacrylate (MMA) were added into 15 parts of 3-methacryloxypropyl trimethoxy silane [$CH_2$=CH($CH_3$)—(C=O)—O—$(CH_2)_3Si(OCH_3)_3$] (TMSM) (manufactured by Shin-Etsu Chemical Co., Ltd.) and 15 parts of tetraethoxysilane [$Si(OCH_2CH_3)_4$] (TEOS) (manufactured by Shin-Etsu Chemical Co., Ltd.). The mixture was stirred at room temperature for one hour to perform hydrolysis and condensation polymerization reactions. Resultant compound was named as "Product 1".

Synthesis Example 2

The same procedure as in Synthesis Example 1 was followed to give Product 2 except that 1.5 parts of perfluorooctylethyl acrylate was used instead of 1.5 parts of heptadecafluoro-1,1,2,2-tetrahydrodecyl triethoxy silane.

Synthesis Example 3

In a 100 mL flask equipped with a stirrer, a thermometer and a dropping funnel, 1.5 parts of heptadecafluoro-1,1,2,2-tetrahydrodecyl triethoxy silane (a fluorine-containing compound) (manufactured by Shin-Etsu Chemical Co., Ltd.) and 5 parts of polymethyl methacrylate (PMMA) were added into 30 parts of tetraethoxysilane (TEOS) (manufactured by Shin-Etsu Chemical Co., Ltd.). The mixture was stirred at room temperature for one hour to perform hydrolysis and condensation polymerization reactions. Resultant compound was named as "Product 3".

Synthesis Example 4

Into a 250 mL flask equipped with a stirrer, 25 parts of a compound of the formula: $CF_3CF_2(CF_2CF_2)_n CH_2CH_2OCOC(CH_3)$=$CH_2$ (a mixture of compuonds wherein n is 3, 4 and 5 in a weight ratio of 5:3:1), 10 parts of $CH_2$=$C(CH_3)COO(CH_2CH_2O)_9CH_3$ and 4 parts of $CH_2$=$C(CH_3)COO(CH_2CH(CH_3)O)_{12}H$ which are polyalkyleneglycol methacrylate, 3 parts of 3-chloro-2-hydroxypropyl methacrylate: $CH_2$=$C(CH_3)COOCH_2CH(OH)CH_2Cl$, 1 part of glycerol monomethacrylate: $CH_2$=$C(CH_3)COOCH_2CH(OH)CH_2OH$, 30 parts of tetraethoxysilane and 120 parts of ethanol are charged and 9 parts of 0.5 N hydrochloric acid was added with stirring. The mixture was stirred at room temperature for 24 hours to perform hydrolysis and condensation polymerization reactions. Resultant compound was named as "Product 4".

Comparative Synthesis Example 1

The same procedure as in Synthesis Example 1 was followed to give Product 5 except that 5 parts of methacrylic acid (MMA) was used instead of 5 parts of methyl methacrylate.

Comparative Synthesis Example 2

The same procedure as in Synthesis Example 1 was followed to give Product 6 except that 1.5 parts of n-decyl triethoxy silane (a long chain alkyl compound) was used instead of 1.5 parts of heptadecafluoro-1,1,2,2-tetrahydrodecyltriethoxy silane (a fluorine-containing compound).

Comparative Synthesis Example 3

The same procedure as in Synthesis Example 1 was followed to give Product 7 except that 30 parts of methyl methacrylate was used instead of 15 parts of 3-methacryloxypropyl trimethoxy silane and 15 parts of tetraethoxysilane.

Comparative Synthesis Example 4

The same procedure as in Synthesis Example 4 was followed to give Product 8 except that 30 parts of polyalkyleneglycol methacrylate was used instead of 30 parts of tetraethoxysilane.

Preparative Example 1

Polymerization of Product 1 (Solution A)

Product 1 provided by Synthesis Example 1 and N,N-dimethylformamide (DMF) were mixed in the amounts shown in Table A to give a mixture liquid.

After dissolved by heat, this mixture liquid was introduced into 1 liter 4-necked flask equipped with a reflux condenser, a nitrogen inlet pipe, a thermometer and a stirring device, and dissolved oxygen was removed by nitrogen replacement. Then ammonium persulfate (APS) as an initiator was introduced in the amount shown in Table A. While stirring, a copolymerization reaction was performed at 60° C. for 8 hours to give a copolymer (Solution A). A glass transition point of the copolymer was 110° C.

Preparative Example 2

Polymerization of Product 2 (Solution B)

The same procedure as in Preparative Example 1 was followed to give a copolymer (Solution B) except that Product 2 was used instead of Product 1 used in the Preparative Example 1. A glass transition point of the copolymer was 108° C.

Preparative Example 3

Polymerization of Product 3 (Solution C)

Product 3 provided by Synthesis Example 3 and N,N-dimethylformamide (DMF) were mixed in the amounts shown in Table A to give a mixture liquid (Solution C). A glass transition point of the compound (Product 3) was 110° C.

Preparative Example 4

Emulsion 1 Polymerization of Product 1 (Emulsion A)

Product 1 provided by Synthesis Example 1, pure water, n-lauryl mercaptan (LSH), polyoxyethylenealkylphenylether ammonium sulfate, (HITENOL N-17, an anionic emulsifier), polyoxyethylenealkylphenyl ether (NONION HS-220, a nonionic emulsifier), polyoxyethylene sorbitan monolaurate (NONION LT-221, a nonionic emulsifier), dipropyleneglycol monomethyl ether (DPM) were mixed in amounts shown in Table A to give a mixture liquid.

After dissolved by heat, the mixture liquid was emulsified with an ultrasonic emulsifier to give an emulsion. The emulsion was introduced into a 1 liter 4-necked flask equipped with a reflux condenser, a nitrogen inlet pipe, a thermometer and a stirring device, and dissolved oxygen was removed by nitrogen replacement. Then ammonium persulfate as initiator (APS) was introduced in the amount shown in Table A. While stirring the copolymerization reaction was performed at 60° C. for 8. hours to give a copolymer (Emulsion A). A glass transition point of the copolymer was 109° C.

Preparative Example 5

Emulsion Polymerization of Product 2 (Emulsion B)

The same procedure as in Preparative Example 4 was followed to give a copolymer (Emulsion B) except that Product 2 was used, instead of Product 1 used in the Preparative Example 4. A glass transition point of the copolymer was 108° C.

Preparative Example 6

The same procedure as in Preparative Example 1 was followed to give a copolymer (Solution D) except that Product 4 and isopropyl alcohol (IPA) were used instead of Product 1 and N,N-dimethylformamide (DMF) used in Preparative Example 1.

Comparative Preparative Example 1

Polymerization of Product 5 (Solution D)

The same procedure as in Preparative Example 1 was followed to give a copolymer (Solution E) except that Product 5 was used instead of Product 1 used in the Preparative Example 1.

Comparative Preparative Example 2

Polymerization of Product 6 (Solution E)

The same procedure as in Preparative Example 1 was followed to give a copolymer (Solution F) except that Product 6 was used instead of Product 1 used in the Preparative Example 1.

Comparative Preparative Example 3

Emulsion Polymerization of Product 5 (Emulsion C)

The same procedure as in Preparative Example 4 was followed to give a copolymer (Emulsion C) except that Product 5 was used instead of Product 1 used in the Preparative Example 4.

Comparative Preparative Example 4

Emulsion Polymerization of Product 6 (Emulsion D)

The same procedure as in Preparative Example 4 was followed to give a copolymer (Emulsion D) except that Product 6 was used instead of Product 1 used in the Preparative Example 4.

Comparative Preparative Example 5

The same procedure as in Preparative Example 1 was followed to give a copolymer (Solution G) except that Product 7 was used instead of Product 1 used in the Preparative Example 1.

Comparative Preparative Example 6

The same procedure as in Preparative Example 1 was followed to give a copolymer (Solution H) except that Product 8 was used instead of Product 1 used in the Preparative Example 1.

TABLE A

| | Preparative Example No. | | | | | | Comparative Preparative Example No. | | | | | |
|---|---|---|---|---|---|---|---|---|---|---|---|---|
| | 1 | 2 | 3 | 4 | 5 | 6 | 1 | 2 | 3 | 4 | 5 | 6 |
| DPM | — | — | — | 30 | 30 | — | — | — | 30 | 30 | — | — |
| Pure water | — | — | — | 401.3 | 401.3 | — | — | — | 401.3 | 401.3 | — | — |
| LSH | — | — | — | 3 | 3 | — | — | — | 3 | 3 | — | — |
| N-17 | — | — | — | 4.5 | 4.5 | — | — | — | 4.5 | 4.5 | — | — |
| HS-220 | — | — | — | 6 | 6 | — | — | — | 6 | 6 | — | — |
| LT-221 | — | — | — | 4.5 | 4.5 | — | — | — | 4.5 | 4.5 | — | — |
| APS | 0.75 | 0.75 | 0.75 | 0.75 | 0.75 | 0.75 | 0.75 | 0.75 | 0.75 | 0.75 | 0.75 | 0.75 |
| Product 1 | 90 | — | — | 90 | — | — | — | — | — | — | — | — |
| Product 2 | — | 90 | — | — | 90 | — | — | — | — | — | — | — |
| Product 3 | — | — | 90 | — | — | — | — | — | — | — | — | — |
| Product 4 | — | — | — | — | — | 90 | — | — | — | — | — | — |
| Product 5 | — | — | — | — | — | — | 90 | — | 90 | — | — | — |
| Product 6 | — | — | — | — | — | — | — | 90 | — | 90 | — | — |
| Product 7 | — | — | — | — | — | — | — | — | — | — | 90 | — |
| Product 8 | — | — | — | — | — | — | — | — | — | — | — | 90 |
| DMF | 450 | 450 | 450 | — | — | — | 450 | 450 | — | — | 450 | 450 |
| IPA | — | — | — | — | — | 450 | — | — | — | — | — | — |

EXAMPLE 1

Solution A prepared in Preparative Example 1 was diluted with N,N-dimethylformamide (DMF) to give a liquid having a solid content of 3% by weight.

The liquid obtained above was sprayed onto a nylon pile carpet fabric (a blue unbacked product) to give a fluorine concentration of 400 ppm, and then the fabric was heated at 130° C. for 10 minutes. Soil releasability, water repellency, oil repellency and adhesion ratio of a coated film were evaluated before and after cleaning. On the other hand, Knoop hardness of the coated film formed from the liquid was measured.

Results are shown in Table C.

EXAMPLE 2

Solution B prepared in Preparative Example 2 was diluted with N,N-dimethylformamide (DMF) to give a liquid having a solid content of 3% by weight. This liquid was evaluated as in Example 1.

Results are shown in Table C.

EXAMPLE 3

Solution C prepared in Preparative Example 3 was diluted with N,N-dimethylformamide (DMF) to give a liquid having a solid content of 3% by weight. This liquid was evaluated as in Example 1.

Results are shown in Table C.

EXAMPLE 4

Emulsion A prepared in Preparative Example 4 was diluted with pure water to give a liquid having a solid content of 3% by weight.

The liquid obtained above was sprayed onto a nylon pile carpet fabric (a blue unbacked product) to give a fluorine concentration of 400 ppm, and then the fabric was heated at 130° C. for 10 minutes. Soil releasability, water repellency, oil repellency and adhesion ratio of a coated film were evaluated before and after cleaning. On the other hand, Knoop hardness of the coated film formed from the liquid was measured.

Results are shown in Table C.

EXAMPLE 5

Emulsion B prepared in Preparative Example 5 was diluted with pure water to give a liquid having a solid content of 3% by weight. This liquid was evaluated as in Example 4.

Results are shown in Table C.

EXAMPLE 6

Solution D prepared in Preparative Example 6 was diluted with ethanol to give a liquid having a solid content of 3% by weight. This liquid was evaluated as in Example 1.

Results are shown in Table C.

Comparative Examples 1 and 2

Each of solutions prepared in Comparative Preparative Examples 1 and 2 was diluted with N,N-dimethylformamide (DMF) to give a liquid having a solid content of 3% by weight. These liquids were evaluated as in.Example 1.

Results are shown in Table C.

Comparative Examples 3 and 4

Each of emulsions prepared in Comparative Preparative Examples 3 and 4 was diluted with pure water to give a liquid having a solid content of 3% by weight. These liquids were evaluated as in Example 4.

Results are shown in Table C.

Comparative Examples 5 and 6

Emulsions prepared in Comparative Preparative Examples 5 and 6 was diluted with DMF and IPA, respectively, to give liquids having a solid content of 3% by weight. These liquids were evaluated as in Example 1.

Results are shown in Table C.

TABLE B

| | | \multicolumn{6}{c}{Example No.} | | | | | | \multicolumn{6}{c}{Comparative Example No.} | | | | | |
|---|---|---|---|---|---|---|---|---|---|---|---|---|---|
| | | 1 | 2 | 3 | 4 | 5 | 6 | 1 | 2 | 3 | 4 | 5 | 6 |
| Inorganic component | TMSM | ○ | ○ | — | ○ | ○ | — | ○ | ○ | ○ | ○ | — | — |
| | TEOS | ○ | ○ | ○ | ○ | ○ | ○ | ○ | ○ | ○ | ○ | — | — |
| Organic component | MMA | ○ | ○ | — | ○ | ○ | — | — | ○ | — | ○ | ○ | — |
| | PMAA | — | — | ○ | — | — | — | — | — | — | — | — | — |
| | MAA | — | — | — | — | — | — | ○ | — | ○ | — | — | — |
| | Fluorine-contaming compound | ○ | ○ | ○ | ○ | ○ | ○ | ○ | — | ○ | — | ○ | ○ |
| | Long chain alkyl compound | — | — | — | — | — | — | ○ | — | ○ | — | — | — |
| | Polyalkylene glycol (meth)acrylate | — | — | — | — | — | ○ | — | — | — | — | — | ○ |
| | 3-Chloro-2-hydroxypropyl methacrylate | — | — | — | — | — | ○ | — | — | — | — | — | ○ |
| | Glycerol monomethacrylate | — | — | — | — | — | ○ | — | — | — | — | — | ○ |
| Emulsifier | | — | — | — | ○ | ○ | — | — | — | ○ | ○ | — | — |

TABLE C

| | | \multicolumn{6}{c}{Example No.} | | | | | | \multicolumn{6}{c}{Comparative Example No.} | | | | | |
|---|---|---|---|---|---|---|---|---|---|---|---|---|---|
| | | 1 | 2 | 3 | 4 | 5 | 6 | 1 | 2 | 3 | 4 | 5 | 6 |
| Before cleaning | Water repellency | 50 | 50 | 50 | 50 | 50 | 50 | 30 | 0 | 30 | 0 | 50 | 50 |
| | Oil repellency | 3 | 3 | 3 | 3 | 3 | 4 | 2 | 0 | 2 | 0 | 3 | 5 |
| | Soil release rate (%) | 77 | 77 | 77 | 75 | 75 | 70 | 37 | 20 | 37 | 20 | 60 | 15 |
| After cleaning (cleaned five times) | Water repellency | 50 | 50 | 50 | 50 | 50 | 50 | 0 | 0 | 0 | 0 | 50 | 20 |
| | Oil repellency | 3 | 3 | 3 | 3 | 3 | 4 | 0 | 0 | 0 | 0 | 3 | 0 |
| | Soil release rate (%) | 74 | 74 | 74 | 72 | 72 | 70 | 14 | 0 | 14 | 0 | 30 | 5 |
| | Fluorine residual rate (%) | 95 | 95 | 95 | 92 | 92 | 90 | 5 | — | 5 | — | 90 | 50 |
| Knoop hardness | | 30 | 30 | 30 | 28 | 28 | 25 | 10 | 30 | 10 | 29 | 5 | 5 |
| Adhesion ratio of coated film (%) | | 95 | 95 | 95 | 90 | 90 | 90 | 20 | 95 | 10 | 90 | 90 | 50 |

ADVANTAGEOUS EFFECTS OF THE INVENTION

The present invention provides a surface treatment agent comprising an inorganic-organic hybrid material which imparts a durability maintaining sufficient water-and oil-repellency, residence of coated film and soil releasability, before and after cleaning.

What is claimed is:

1. A surface treatment agent comprising:
   (A) a metal alkoxide, and
   (B) a polymer comprising repeating units derived from
      (B-i) a monomer having a carbon-carbon double bond and a metal alkoxide group,
      (B-ii) a fluorine-free (meth)acrylic acid derivative monomer, and one of
      (B-iii) a fluorine-containing compound having a functional group reactive with the metal alkoxide, and
   (B-iv) a fluorine-containing monomer having a carbon-carbon double bond which is a fluorine-containing (meth)acrylate.

2. A surface treatment agent comprising:
   (A) a metal alkoxide,
   (D) a polymer comprising repeating units derived from
      (D-i) a fluorine-free (meth)acrylic acid derivative monomer, and
   (E) a fluorine-containing compound having a functional group reactive with the metal alkoxide.

3. The treatment agent according to claim 1 or 2, wherein the number of alkoxide groups in the metal alkoxide (A) is from 1 to 12.

4. The treatment agent according to claim 1 or 2, wherein a metal in the metal alkoxide (A) is selected from the group consisting of Si, Ti, Al, Zr, Sn and Fe.

5. The treatment agent according to claim 1, wherein a metal atom in the monomer having carbon-carbon double bond and metal alkoxide group (B-i) is selected from the group consisting of Si, Ti, Al, Zr, Sn and Fe.

6. The treatment agent according to claim 1 or 2, wherein the functional group in the fluorine-containing compound having functional group reactive with metal alkoxide (B-iii) or (E) is a reactive group selected from the group consisting of an alkoxysilane group, a carboxyl group, a hydroxyl group, an epoxy group, a phosphate group, a halogenated silyl group, a sulfonate group, an isocyanate group and a blocked isocyanate group.

7. The treatment agent according to claim 1, wherein the fluorine-containing monomer having carbon-carbon double bond (B-iv) at least one material selected from the group consisting of:

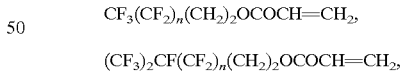

and

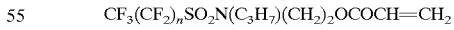

wherein n is from 0 to 10.

8. A coated film formed from the treatment agent according to claim 1 or 4, wherein the coated film comprises an uneven layer having the whole surface which is roughened by forming microscopic unevenness and a surface roughness of the uneven layer of the coated film is a maximum height (Rmax) of 0.01 to 100 μm.

9. The coated film according to claim 8, wherein a thickness of the coated film is from 0.001 to 100 μm.

* * * * *